(12) United States Patent
Matsuda

(10) Patent No.: US 10,836,598 B2
(45) Date of Patent: Nov. 17, 2020

(54) WEB CONVEYING DEVICE

(71) Applicant: JTEKT CORPORATION, Osaka (JP)

(72) Inventor: Tsubasa Matsuda, Kariya (JP)

(73) Assignee: JTEKT CORPORATION, Osaka (JP)

( * ) Notice: Subject to any disclaimer, the term of this patent is extended or adjusted under 35 U.S.C. 154(b) by 64 days.

(21) Appl. No.: 16/051,596

(22) Filed: Aug. 1, 2018

(65) Prior Publication Data

US 2019/0039846 A1 Feb. 7, 2019

(30) Foreign Application Priority Data

Aug. 4, 2017 (JP) .................................. 2017-151280

(51) Int. Cl.
*B65H 20/24* (2006.01)
*B65H 20/06* (2006.01)
*B65H 23/022* (2006.01)

(52) U.S. Cl.
CPC ............. *B65H 20/24* (2013.01); *B65H 20/06* (2013.01); *B65H 23/022* (2013.01); *B65H 2301/517* (2013.01); *B65H 2301/5114* (2013.01); *B65H 2301/522* (2013.01); *B65H 2404/233* (2013.01); *B65H 2404/262* (2013.01); *B65H 2701/132* (2013.01); *B65H 2801/72* (2013.01)

(58) Field of Classification Search
CPC ........ B65H 20/06; B65H 20/24; B65H 23/02; B65H 23/022; B65H 23/26; B65H 2301/522; B65H 2301/52202
USPC .......................................................... 226/92
See application file for complete search history.

(56) References Cited

U.S. PATENT DOCUMENTS

| | | | | | |
|---|---|---|---|---|---|
| 2,277,319 | A | * | 3/1942 | Greenberger | C23G 3/021 226/92 |
| 2,862,705 | A | * | 12/1958 | Faeber | F26B 13/107 226/92 |
| 2,944,345 | A | * | 7/1960 | Faeber | B41F 13/03 34/575 |
| 3,619,050 | A | * | 11/1971 | Swanke | G03G 15/754 399/161 |
| 3,624,875 | A | * | 12/1971 | Haft | D06H 3/04 356/238.1 |
| 4,309,830 | A | * | 1/1982 | Vits | B65H 20/20 226/92 |
| 4,467,950 | A | * | 8/1984 | Karlsson | F26B 13/107 226/91 |

FOREIGN PATENT DOCUMENTS

| | | |
|---|---|---|
| JP | 62-164252 U | 10/1987 |
| JP | 62-239167 | 10/1987 |

* cited by examiner

*Primary Examiner* — William E Dondero
(74) *Attorney, Agent, or Firm* — Oblon, McClelland, Maier & Neustadt, L.L.P.

(57) ABSTRACT

To form a web conveying path that bends and conveys a web, a web conveying device has: a plurality of foil supporting members that are disposed at prescribed intervals in a conveying direction of the web and that support a surface of the web that is being conveyed; a foil extending member stretched between the foil supporting members, which pulls an end of the web downstream in the conveying direction of the web such that the web extends from a starting point to an end point of the web conveying path that is formed by the foil supporting members; and a moving mechanism that moves the foil extending member from the starting point to the end point of the web conveying path.

5 Claims, 15 Drawing Sheets

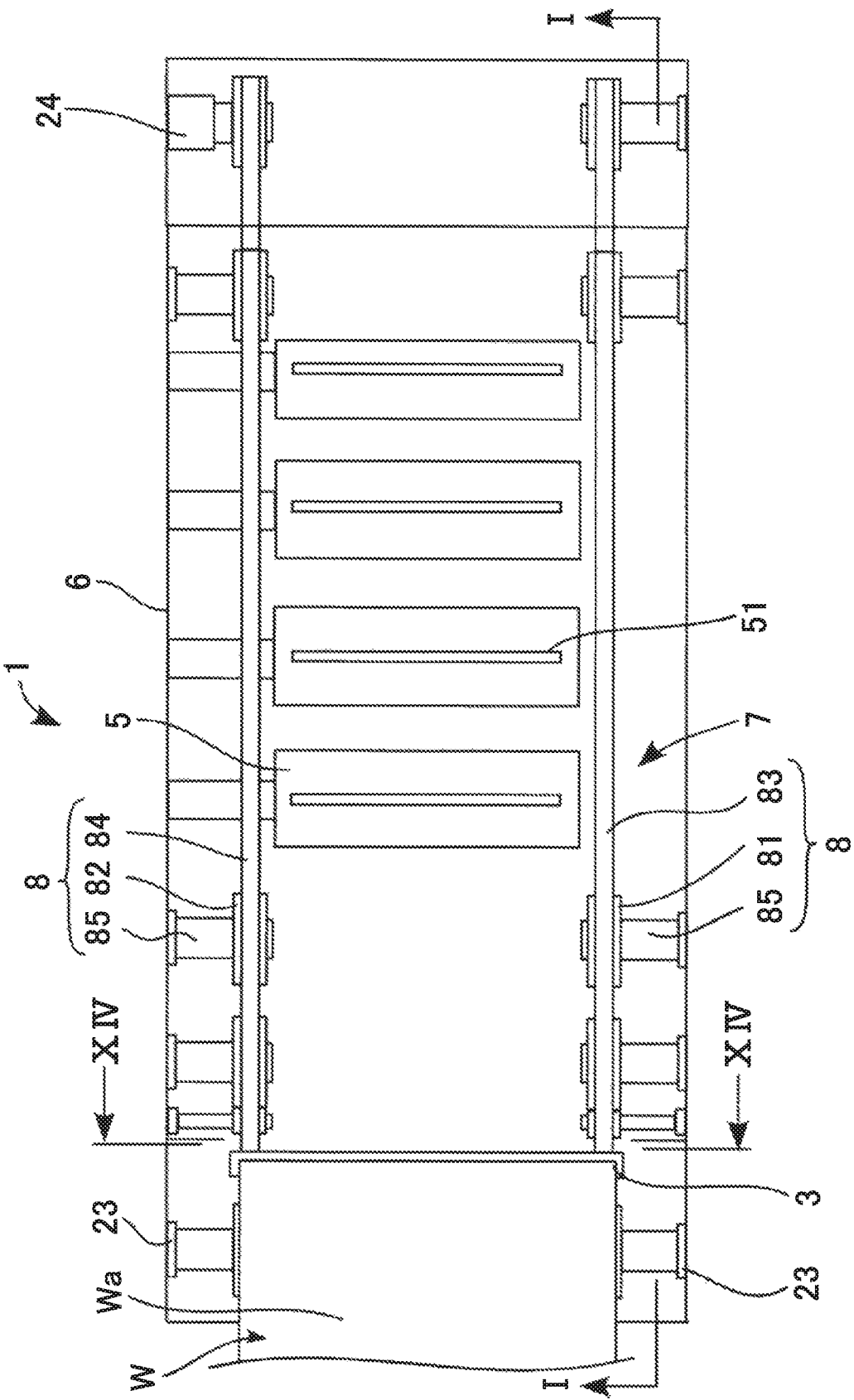

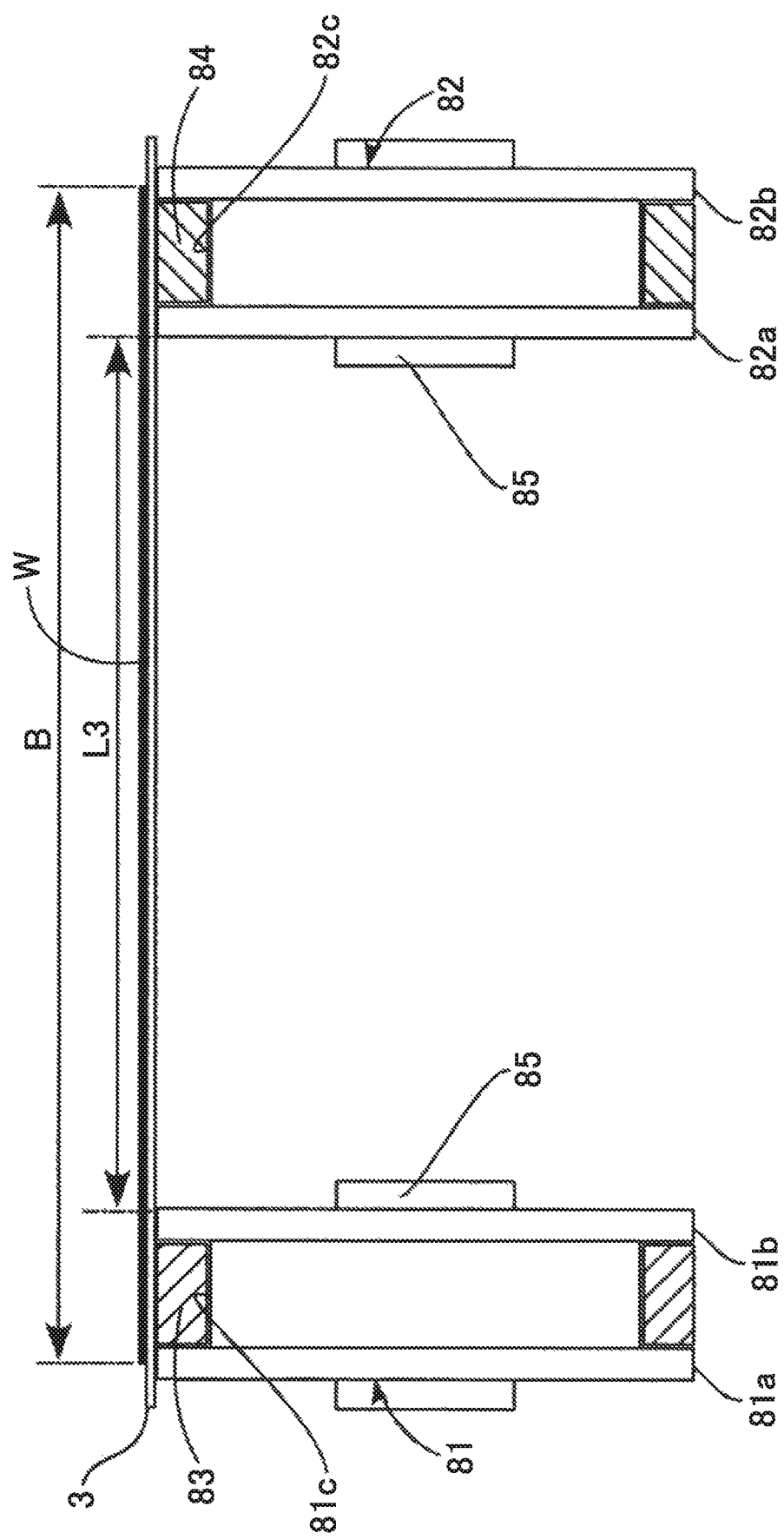

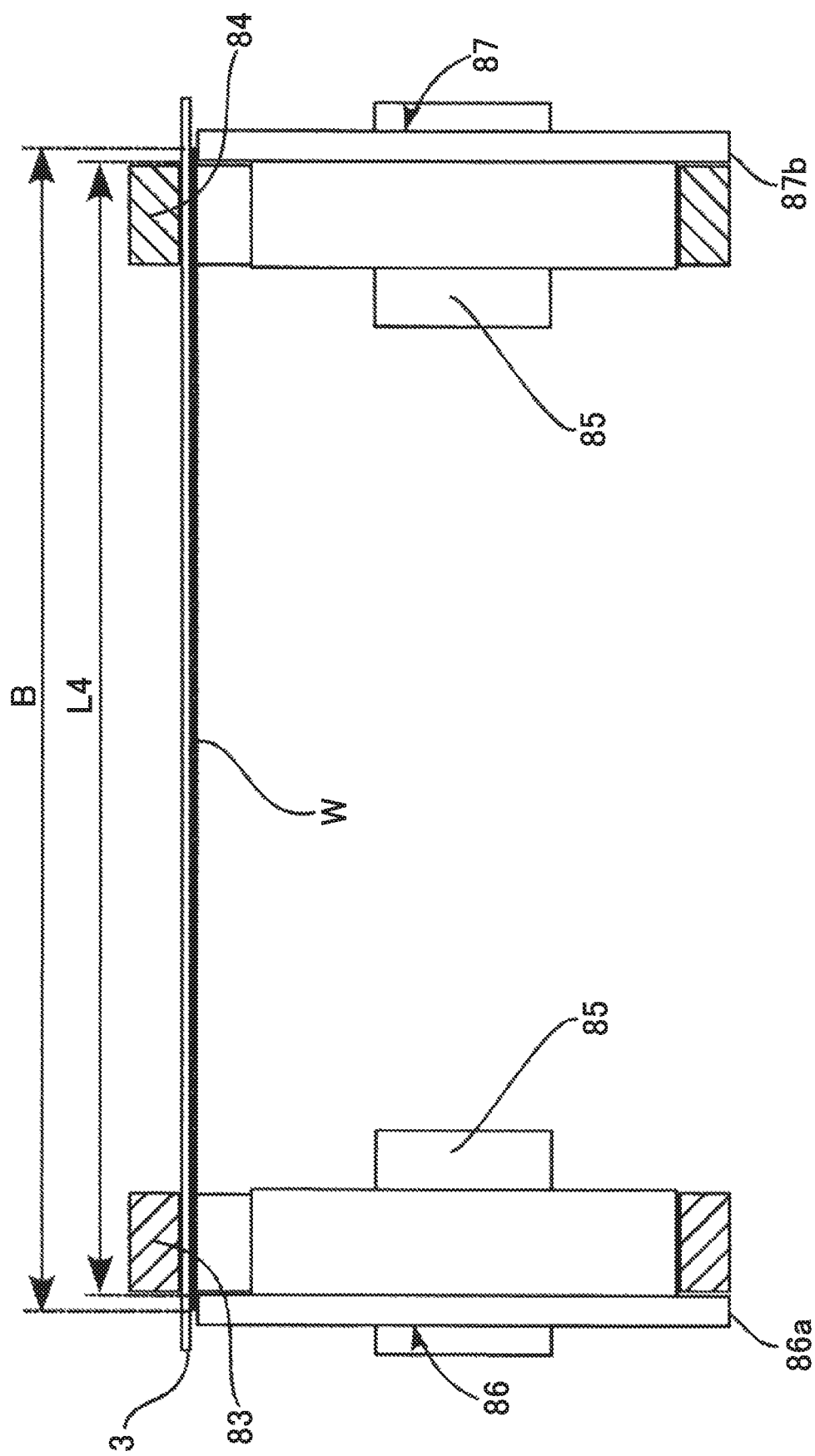

WEB CONVEYING DEVICE

INCORPORATION BY REFERENCE

The disclosure of Japanese Patent Application No. 2017-151280 filed on Aug. 4, 2017 including the specification, drawings and abstract, is incorporated herein by reference in its entirety.

BACKGROUND OF THE INVENTION

1. Field of the Invention

The invention relates to a web conveying device.

2. Description of Related Art

Japanese Patent Application Publication No. S62-239167 (JP S62-239167 A) describes a web conveying device that handles transfer material as a web. The web conveying device has a driving roller, a driven roller, and a string-like belt. Spiral grooves are formed on circumferential surfaces of the driving roller and the driven roller. The driving roller and the driven roller are disposed at a prescribed interval. The string-like belt is spirally wound around along the grooves, between the driving roller and the driven roller. A round bar that is in contact with the belt and that guides the movement of the belt is disposed near the driving roller so that the belt does not come off the groove.

Japanese Utility Model Application Publication No. S62-164252 (JP S62-164252 U) describes a web conveying device that conveys paper sheets as a web. The web conveying device has a plurality of belt-pulley mechanisms. The belt-pulley mechanisms are disposed in parallel with each other. V-shaped grooves or teeth are provided on the belt so as to prevent the belt from coming off a pulley.

In the configuration of the web conveying device described in JP S62-239167 A and JP S62-164252 U, the web conveying device tends to increase in size when a web conveying path is long. In order to decrease the size of the web conveying device while keeping the web conveying path long, it is necessary to adopt a path that bends and conveys the web, that is, a turnover conveying path or an S-shaped (inverse S-shaped) conveying path, and turn over the path or make the path S-shaped (inverse S-shaped) so as to minimize the distance between the overlapping parts of the web conveying path.

In the web conveying device, it is necessary to bend and extend the web from a starting point to an end point of the web conveying path as preparation for conveying the web. However, since the distances between the overlapping parts of the web conveying path are narrow, it is difficult to manually insert the web.

SUMMARY OF THE INVENTION

An object of the invention is to provide a web conveying device in which a web can be easily extended from a starting point to an end point of a web conveying path.

The web conveying device according to an aspect of the invention includes the web conveying path that bends and conveys the web. The web conveying device includes: a plurality of foil supporting members that are disposed at intervals in a conveying direction of the web and that support a surface of the web that is being conveyed; a foil extending member that extends the web from a starting point to an end point of the web conveying path formed by the foil supporting members, by conveying the web downstream in the conveying direction of the web; and a moving mechanism that moves the foil extending member from the starting point to the end point of the web conveying path.

In the web conveying device according to the above-mentioned aspect, the moving mechanism is operated so as to convey the web downstream in the conveying direction with the foil extending member, such that the web extends along the bent web conveying path. Thus, even if the distance between the overlapping parts of the web conveying path is narrow, there is no need to manually insert the web, and the web can be easily extended from the starting point to the end point of the web conveying path. Therefore, the production time of the web can be significantly reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 13 is a sectional view of a web drying device that has a web conveying device of a modification with reference to FIG. 2;

FIG. 14 is a sectional view of the web drying device taken along line XIV-XIV in FIG. 13; and FIG. 15 is sectional view of another embodiment of the web conveying device with reference to FIG. 12.

DETAILED DESCRIPTION OF EMBODIMENTS

Figure 1:
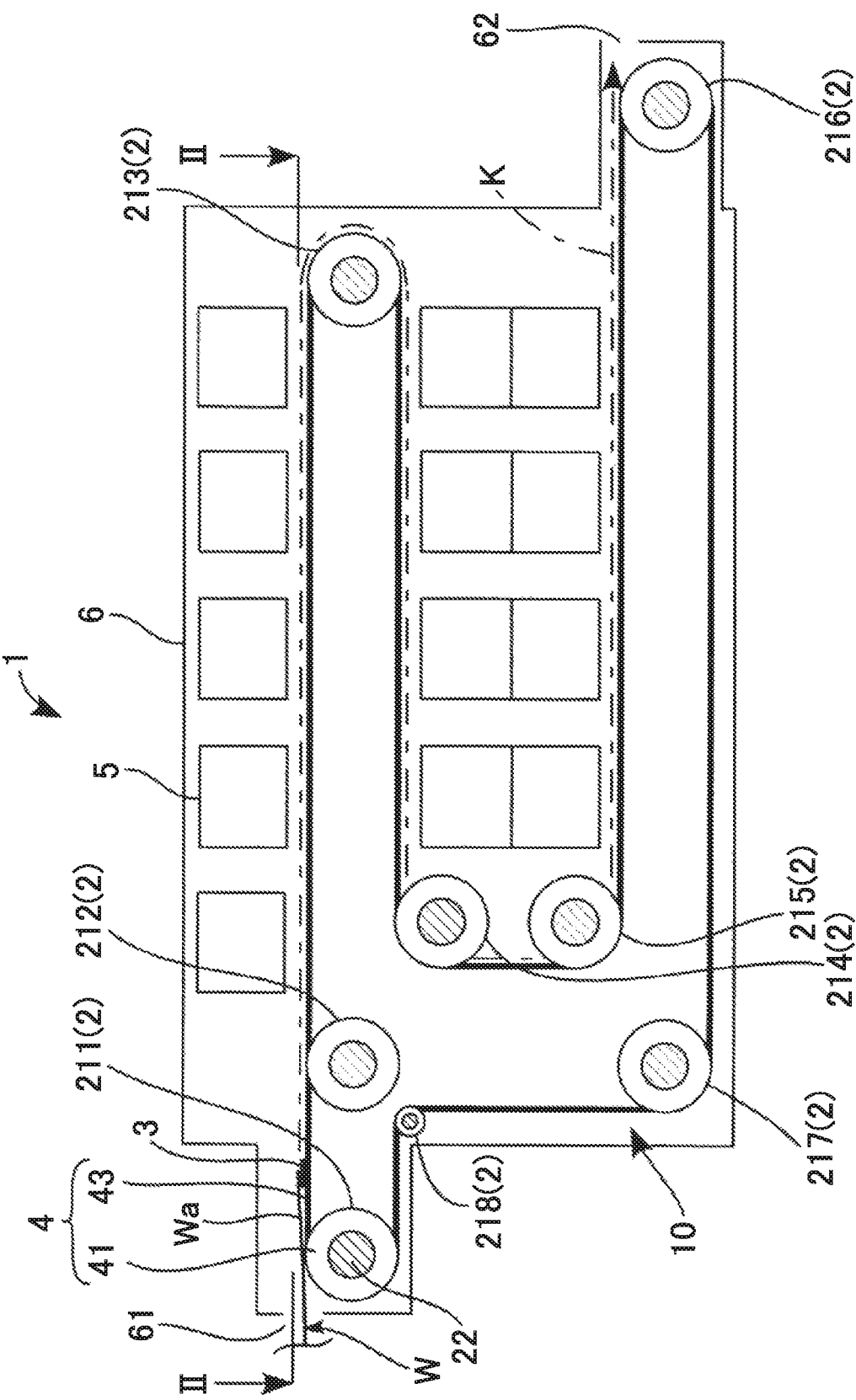
FIG. 1 is a diagram that shows the general configuration of a web drying device that has a web conveying device of an embodiment, and is a sectional view taken along line I-I in FIG. 2.

Hereinafter, the schematic configuration of a web drying device that has an embodiment of a web conveying device of the invention will be described with reference to FIGS. 1 and 2. The web drying device 1 is installed in a system that manufactures electrodes of a lithium ion capacitor, and dries the slurry electrode material as a coating material that is applied to a surface Wa of the web W while carrying metal foil as a web W, for example.

Here, aluminum foil is used as the metal foil of a positive electrode of the lithium ion capacitor and bronze foil is used as the metal foil of a negative electrode, for example. Activated carbon is used as an electrode material of the positive electrode of the lithium ion capacitor and graphite is used as an electrode material of the negative electrode, for example.

The web drying device 1 has a web conveying device 10, a hot air generator 5, and a drying chamber 6 etc. The web conveying device 10 has a foil supporting member 2, a foil extending member 3, and a moving mechanism 4 etc. In order to form a web conveying path K (long dashed short dashed line arrow shown in FIG. 1) that bends and conveys the web W, a plurality of the foil supporting members 2 are disposed at intervals in the conveying direction of the web W and support a surface of the web W that is being conveyed.

The foil extending member 3 pulls an end of the web W downstream in the conveying direction of the web W, such that the web W extends from a starting point (a conveying entrance 61 provided on the upper left side of the drying chamber 6 shown in FIG. 1) to the end point (a conveying exit 62 provided on the lower right side of the drying chamber 6 shown in FIG. 1) of the web conveying path K that is formed by the foil supporting members 2.

The moving mechanism 4 moves the foil extending member 3 from the conveying entrance 61 to the conveying exit 62 of the drying chamber 6. The hot air generator 5 blows hot air toward the surface Wa of the web W to dry the coating material applied to the surface Wa of the web W. The drying chamber 6 has a hollow box shape and includes the foil supporting member 2, the foil extending member 3, the moving mechanism 4, and the hot air generator 5.

To be more specific, the foil supporting member 2 has a plurality of (in the example, eight) cylindrical first to eighth rollers 211 to 218 in which outer peripheral surfaces support the surface of the web W, roller shafts 22 each inserted in a center hole of the corresponding one of the rollers 211 to 218, and brackets 23 each including a bearing, not shown, that are provided on an inner wall of the drying chamber 6.

The first to fifth, the seventh, and the eighth rollers 211 to 215, 217, and 218 are each rotatably supported by the roller shaft 22. Both ends of the roller shafts 22 inserted in the rollers 211 to 215, 217, and 218 are rotatably supported by the bracket 23 via the bearing.

The sixth roller 216 is rotatably supported by the roller shaft 22. The roller shaft 22 inserted in the sixth roller 216 is rotatably supported by one end of the roller shaft 22 via the bearing. The other end of the roller shaft 22 is coupled to a motor shaft of a driving motor 24.

The first to eighth rollers 211 to 218 are disposed so that the web conveying path K has an inverse S shape when viewed in a direction parallel to the surface of the conveyed web W and perpendicular to the conveying direction of the web W shown in FIG. 1. That is, the first roller 211 is disposed near the conveying entrance 61 of the drying chamber 6. The second roller 212 is disposed in a front part of the drying chamber 6 near the conveying entrance 61 (shown on the left side in the figure) on the same horizontal line as the first roller 211. The third roller 213 is disposed in a back part of the drying chamber 6 (shown on the right side in the figure) on the same horizontal line as the second roller 212.

The fourth roller 214 is disposed in the front part of the drying chamber 6 (shown on the left side in the figure) and one step lower than the third roller 213. That is, the fourth roller 214 is disposed so that the web W turned over by a lower peripheral surface of the third roller 213 can be received by an upper peripheral surface of the fourth roller 214. The fifth roller 215 is disposed in a position directly below the fourth roller 214.

The sixth roller 216 is disposed in a position near the conveying exit 62 of the drying chamber 6 and one step lower than the fifth roller 215. That is, the sixth roller 216 is disposed so that the web W turned over by a lower peripheral surface of the fifth roller 215 can be received by an upper peripheral surface of the sixth roller 216.

The seventh roller 217 is disposed in the front part of the drying chamber 6 (shown on the left side in the figure), on the same horizontal line as the sixth roller 216, and below the second roller 212. The eighth roller 218 that applies tension to a first foil extending belt 43 and a second foil extending belt 44 described below is disposed between the seventh roller 217 and the first roller 211.

The moving mechanism 4 has a plurality of (in the example, eight) first foil extending pulleys 41, a plurality of (in the example, eight) second foil extending pulleys 42, the endless track first foil extending belt 43, and the endless track second foil extending belt 44. The first foil extending pulley 41 is disposed at one end face of each of the first to eighth rollers 211 to 218 and is integrally fitted to the roller shaft 22.

The second foil extending pulley 42 is disposed at the other end face of each of the first to eighth rollers 211 to 218 and is integrally fitted to the roller shaft 22. A handle that is not shown is provided on the first foil extending pulley 41 that is supported by the roller shaft 22 at one end of the first roller 211, so that the first foil extending pulley 41 is manually rotatable.

Figure 3:
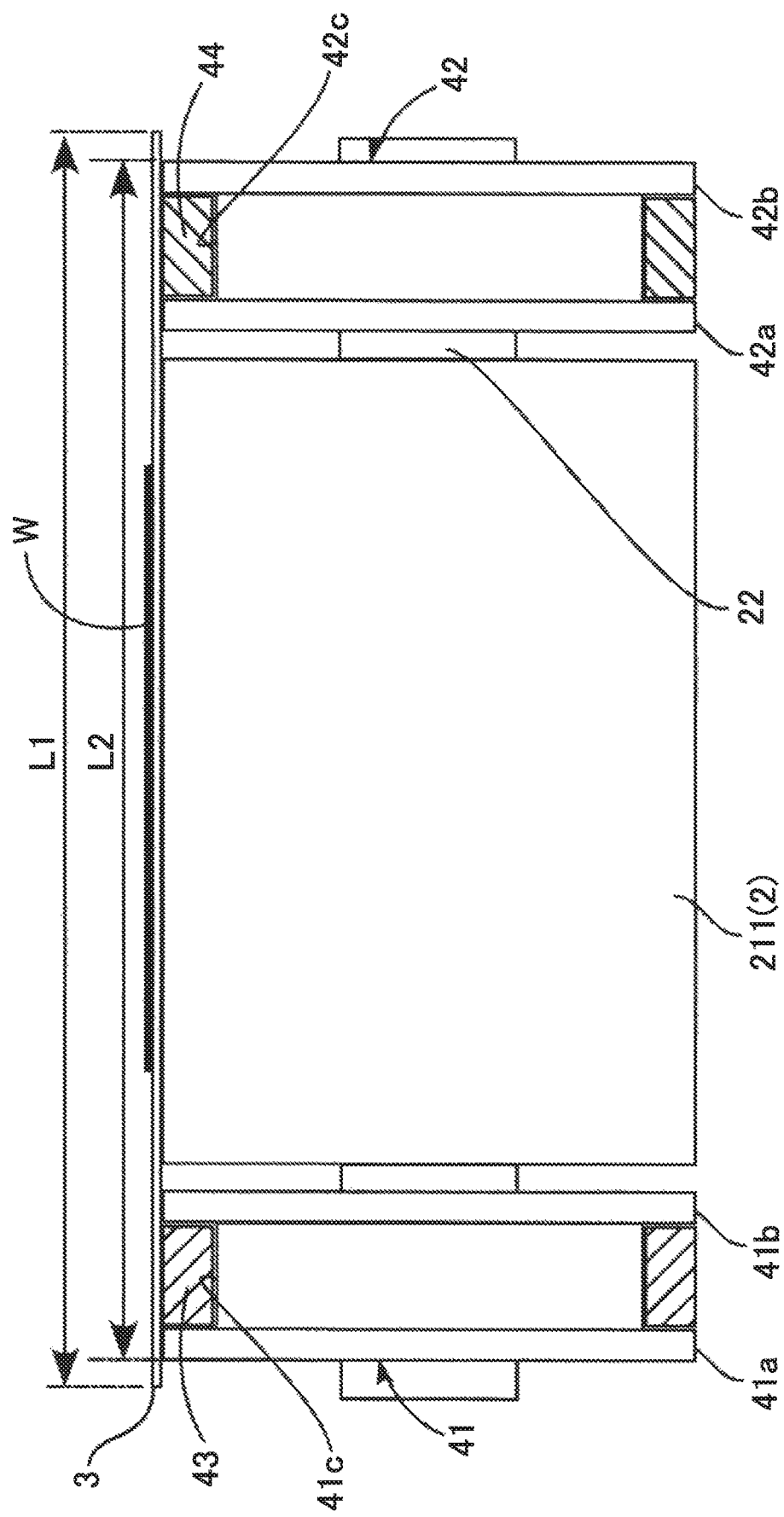
FIG. 3 is a sectional view of the web drying device taken along line in FIG. 2.

As shown in FIG. 3, flanges 41a and 41b are provided at peripheral edges of both end faces of the first foil extending pulley 41. Flanges 42a and 42b are provided at peripheral edges of both end faces of the second foil extending pulley 42.

Figure 2:
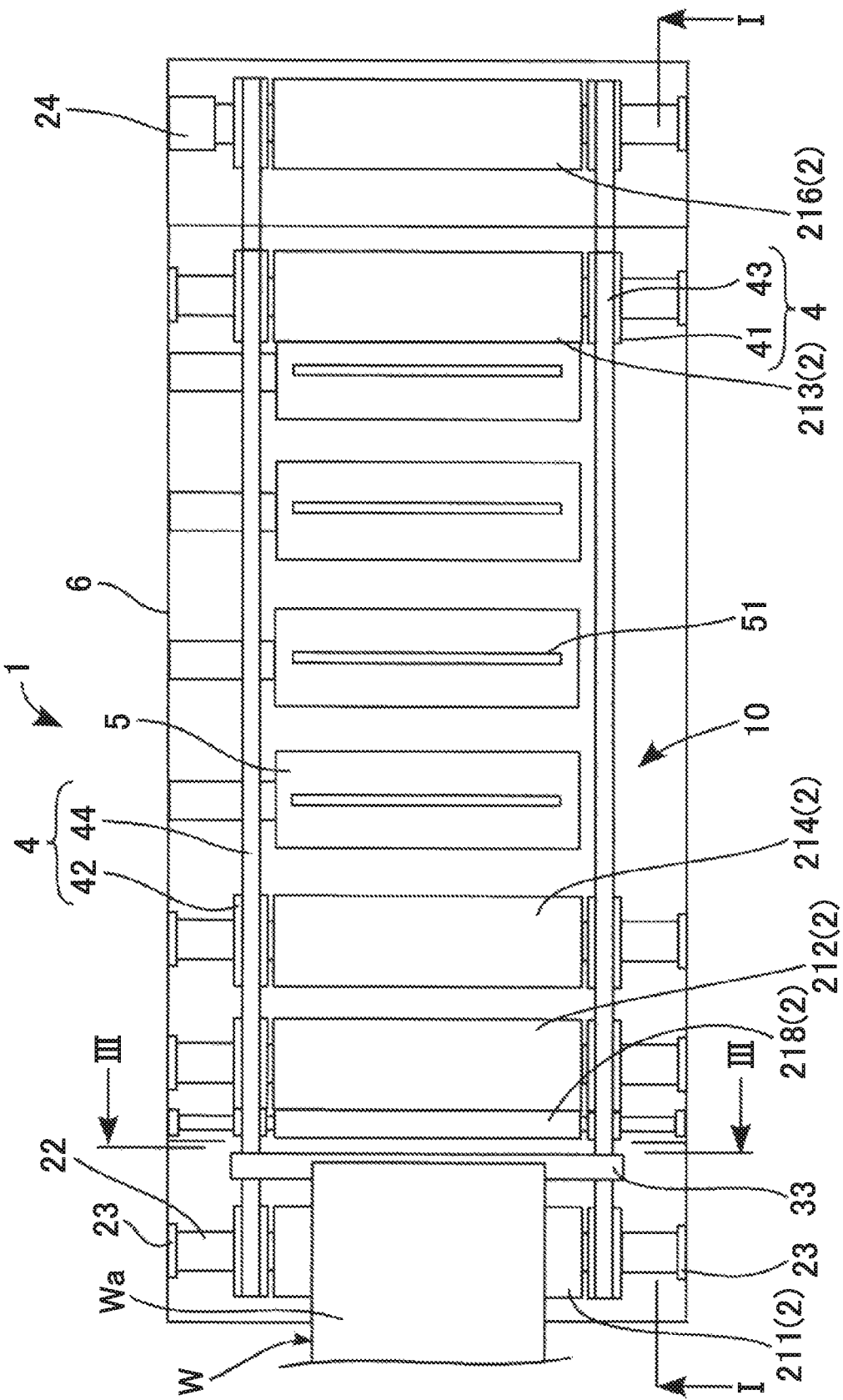
FIG. 2 is a sectional view of the web drying device taken along line II-II in FIG. 1.

As shown in FIGS. 1 and 2, the first foil extending belt 43 is stretched between the first foil extending pulleys 41 disposed at the one end faces of the first to eighth rollers 211 to 218 and is fitted in grooves 41c (see FIG. 3) between the flanges 41a, 41b formed at the peripheral edges of both end faces of the first foil extending pulley 41.

The second foil extending belt 44 is stretched between the second foil extending pulleys 42 disposed at the other end faces of the first to eighth rollers 211 to 218 and is fitted in grooves 42c between the flanges 42a, 42b formed at the peripheral edges of both end faces of the second foil extending pulley 42. The first foil extending belt 43 and the second foil extending belt 44 are formed so that metal foreign substances that adversely affect the electrodes are not generated, and are formed by resin that can withstand drying heat.

The foil extending member 3 has a rectangular plate-shape. As shown in FIG. 3, a length L1 of the foil extending member 3 is set so as to be longer than a length L2 between an outer edge of the flange 41a positioned at the outer end of the first foil extending pulley 41 disposed at the one end face of the first roller 211 (the same in the case of other rollers) and an outer edge of the flange 42b positioned at the outer end of the second foil extending pulley 42 disposed at the other end face of the first roller 211 (hereinafter simply referred to as the length L2 between the outer edges of the outer flanges 41a and 41b). The reason for this will be described below.

The foil extending member 3 is stretched between the first foil extending belt 43 and the second foil extending belt 44 in a direction generally perpendicular to the conveying direction. Both ends of the foil extending member 3 are disposed so as to face the flange 41a at the outer end of the first foil extending pulley 41 disposed at the one end face of the first roller 211 and the flange 42b at the outer end of the second foil extending pulley 42 disposed at the other end face of the first roller 211. The ends of the foil extending member 3 are fixed to the first foil extending belt 43 and the second foil extending belt 44. An end of the web W is affixed to the foil extending member 3. The foil extending member 3 is formed so that metal foreign substances that adversely affect the electrodes are not generated, and is formed by resin that can withstand drying heat.

In the hot air generator 5, a fan and a heater (both not shown) are installed and a nozzle port 51 that blows the generated hot air is provided. A plurality of the hot air generators 5 are disposed along the web conveying path K in the drying chamber 6 so as to blow hot air from above or below onto the surface Wa of the web W that is being conveyed and dry the coating material applied on the surface Wa of the web W. The hot air generators 5 are supported in a cantilever state by the inner wall of the drying chamber 6.

As of the above, in the web conveying device 10, the web W is conveyed downstream in the conveying direction of the web W with the foil extending member 3 so as to extend the web W along the bent web conveying path K. That is, the foil extending member 3 extends the web W along the bent web conveying path K while pulling the end of the web W downstream in the conveying direction of the web W. Thus, even if the distances between the overlapping parts of the web conveying path K are narrow, there is no need to manually insert the web W, and the web W can be easily extended from the conveying entrance 61 to the conveying exit 62 of the drying chamber 6.

The web W affixed to the foil extending member 3 can be surely extended from the conveying entrance 61 to the conveying exit 62 of the drying chamber 6 since the foil extending member 3 is moved while being fixed to the first foil extending belt 43 and the second foil extending belt 44. Thus, the production time of the web W can be significantly reduced.

The web conveying device 10 of the embodiment has a configuration in which the web conveying path K has an inverse S shape and the distances between the overlapping parts of the web conveying path K are narrow due to the inverse S shape. However, the web W does not need to be manually extended in the web conveying path K.

That is, an operator can bend and insert the web W from the conveying entrance 61 to the conveying exit 62 of the drying chamber 6 by affixing the end of the web W to the foil extending member 3 and manually rotates the handle provided on the first foil extending pulley 41 of the first roller 211.

As described above, the foil extending member 3 is formed so that the length L1 of the foil extending member 3 is longer than the length L2 between the outer edges of the outer flanges 41a, 42b (see FIG. 3). This is because the following problems occur when a foil extending member 3A is formed to have a length L1A shorter than the length L2 between the outer edges of the outer flanges 41a, 42b, as shown in FIG. 9.

Figure 9:
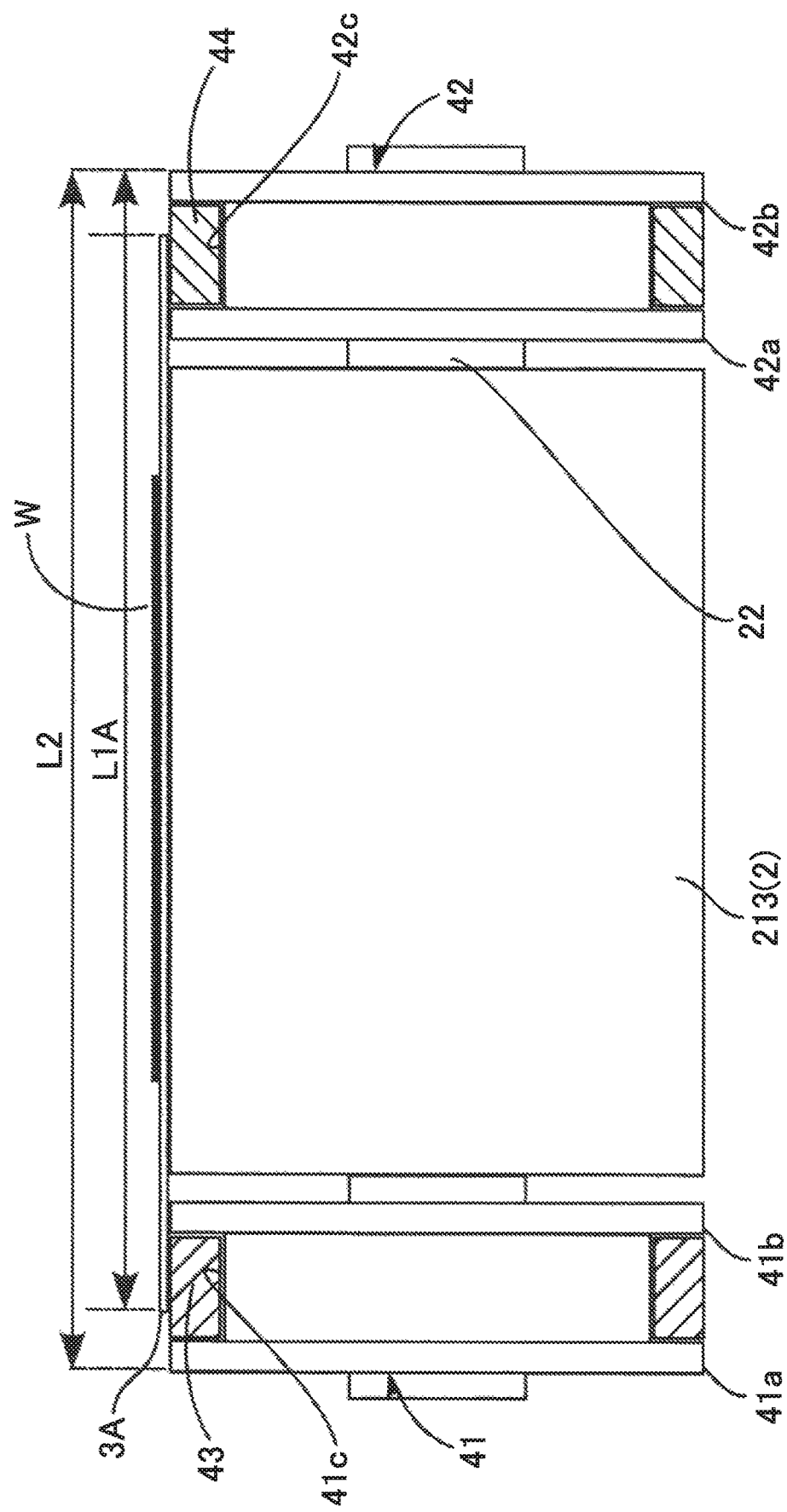
FIG. 9 is partial sectional view, in the conveying direction, of the web drying device when the web before reversal passes along the pulleys during the conveyance by the foil extending member, with the length of the foil extending member changed.

That is, as shown in FIG. 9, when the foil extending member 3A passes along outer peripheral surfaces of the first and second foil extending pulleys 41, 42 of the third roller 213, the first and second foil extending belts 43, 44 are fitted into the grooves 41c, 42c of the first and second foil extending pulleys 41, 42, for example. Thus, the foil extending member 3A moves smoothly along an outer periphery of the first and second foil extending pulleys 41, 42 since the foil extending member 3A is fixed to the outer periphery of the first and second foil extending belts 43, 44.

Figure 10:
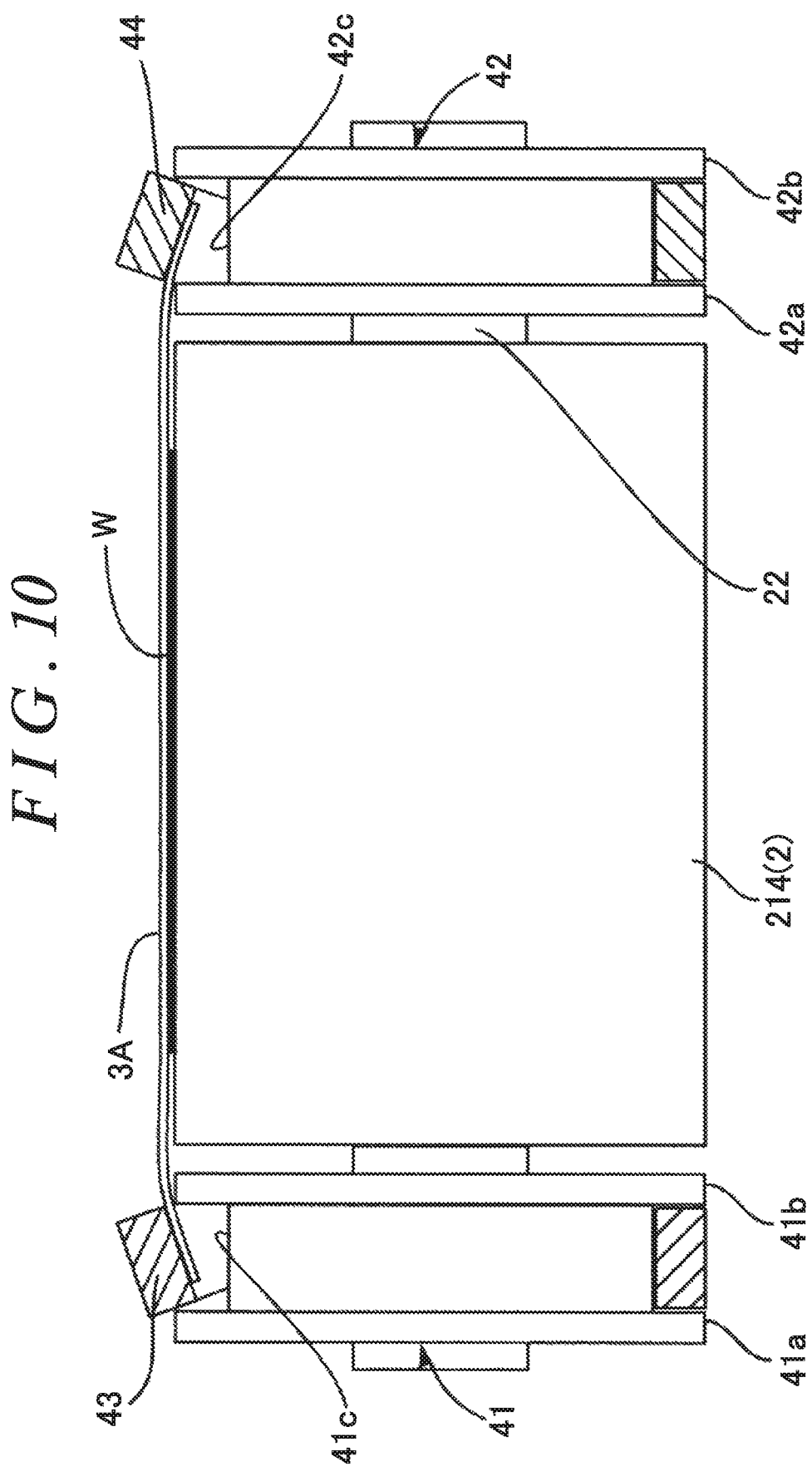
FIG. 10 is partial sectional view, in the conveying direction, of the web drying device when the web after reversal passes along the pulleys during the conveyance by the foil extending member, with the length of the foil extending member changed.

However, as shown in FIG. 10, when the foil extending member 3A passes along the outer peripheral surfaces of the first and second foil extending pulleys 41, 42 of the fourth roller 214 for example, the positions of the foil extending member 3A and the first and second foil extending belts 43, 44 are reversed. Thus, the first and second foil extending belts 43, 44 come off the grooves 41c, 42c of the first and second foil extending pulleys 41, 42 and both ends of the foil extending member 3A float from the grooves 41c, 42c of the first and second foil extending pulleys 41, 42.

In this state, forces toward centers of the first and second foil extending pulleys 41, 42 are applied to the ends of the foil extending member 3A since tensile force is applied to the first and second foil extending belts 43, 44 in a rotational direction. Both ends of the foil extending member 3A deflect towards the center of the first and second foil extending pulleys 41, 42 in the grooves 41c, 42c, since both ends of the foil extending member 3A are cantilever.

Figure 11:
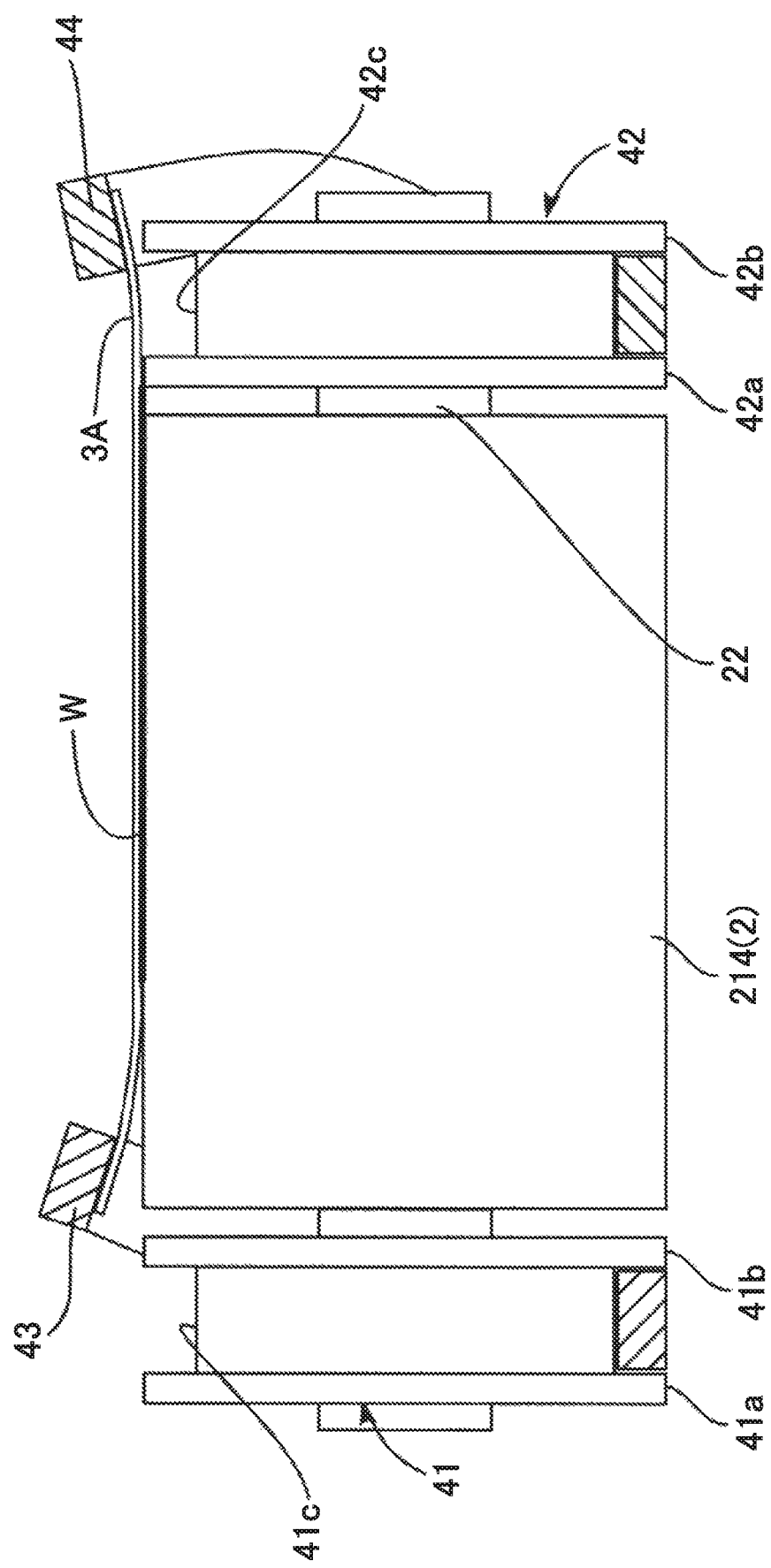
FIG. 11 is a partial sectional view of the web drying device in which belts have come off the pulleys during the conveyance shown in FIG. 10 when viewed in the conveying direction.

When the forces applied to the ends of the foil extending member 3A are unbalanced, a force in a direction along a rotational axis of the first and second foil extending pulleys 41, 42 is applied to the foil extending member 3A and there is a risk of the first and second foil extending belts 43, 44 falling off the first and second foil extending pulleys 41, 42, as shown in FIG. 11.

Figure 6:
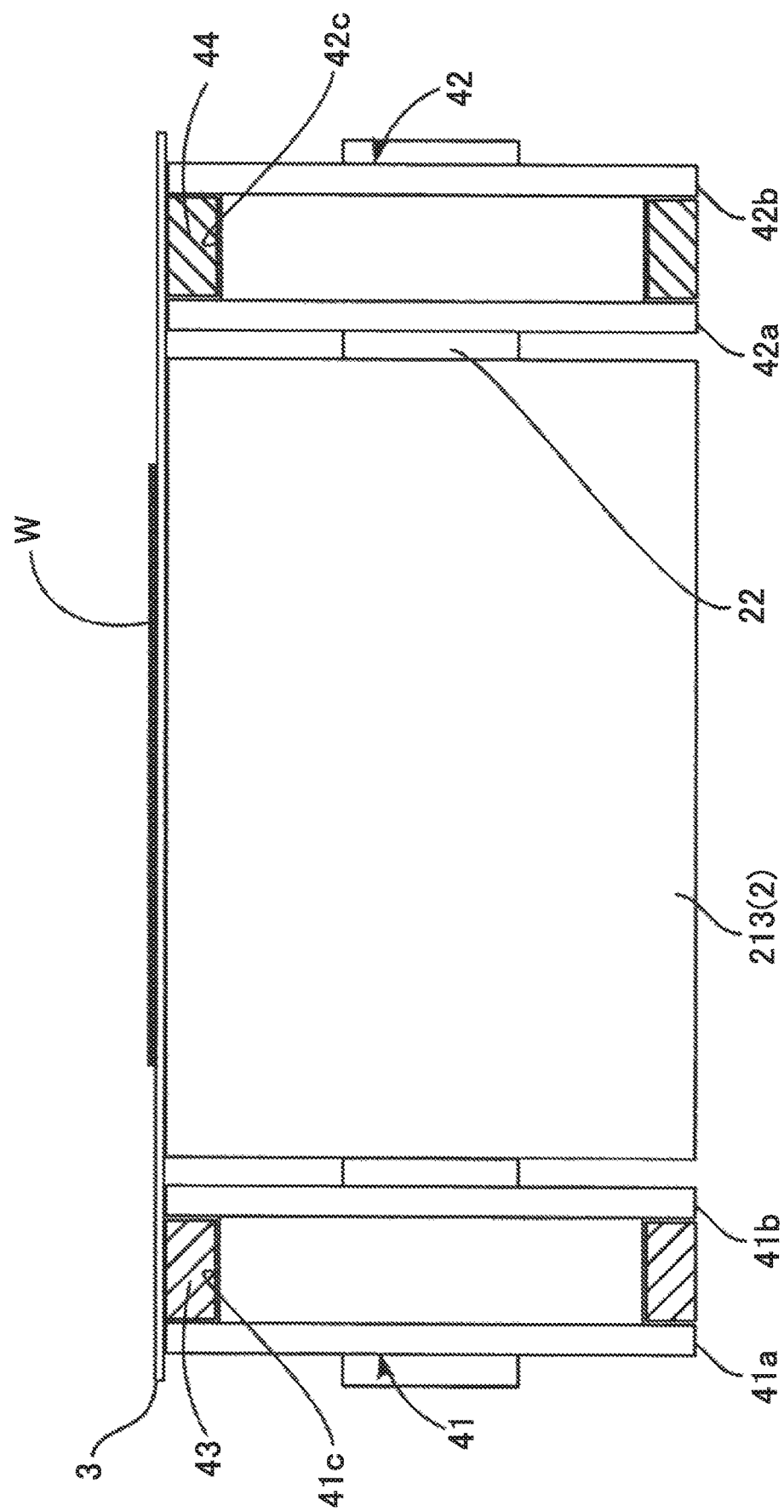
FIG. 6 is a partial sectional view of the web drying device when the web before reversal passes along pulleys during conveyance by the foil extending member, when viewed in the conveying direction.

As shown in FIG. 6, when the foil extending member 3 of the embodiment passes along the outer peripheral surfaces of the first and second foil extending pulleys 41, 42 of the third roller 213 for example, the first and second foil extending belts 43, 44 are fitted into the grooves 41c, 42c of the first and second foil extending pulleys 41, 42. Both ends of the foil extending member 3 are fixed to the outer periphery of the first and second foil extending belts 43, 44 and are supported by the flanges 41a, 41b, 42a, 42b of the first and second foil extending pulleys 41, 42. Thus, the foil extending member 3 moves smoothly along the outer periphery of the first and second foil extending pulleys 41, 42.

Figure 7:
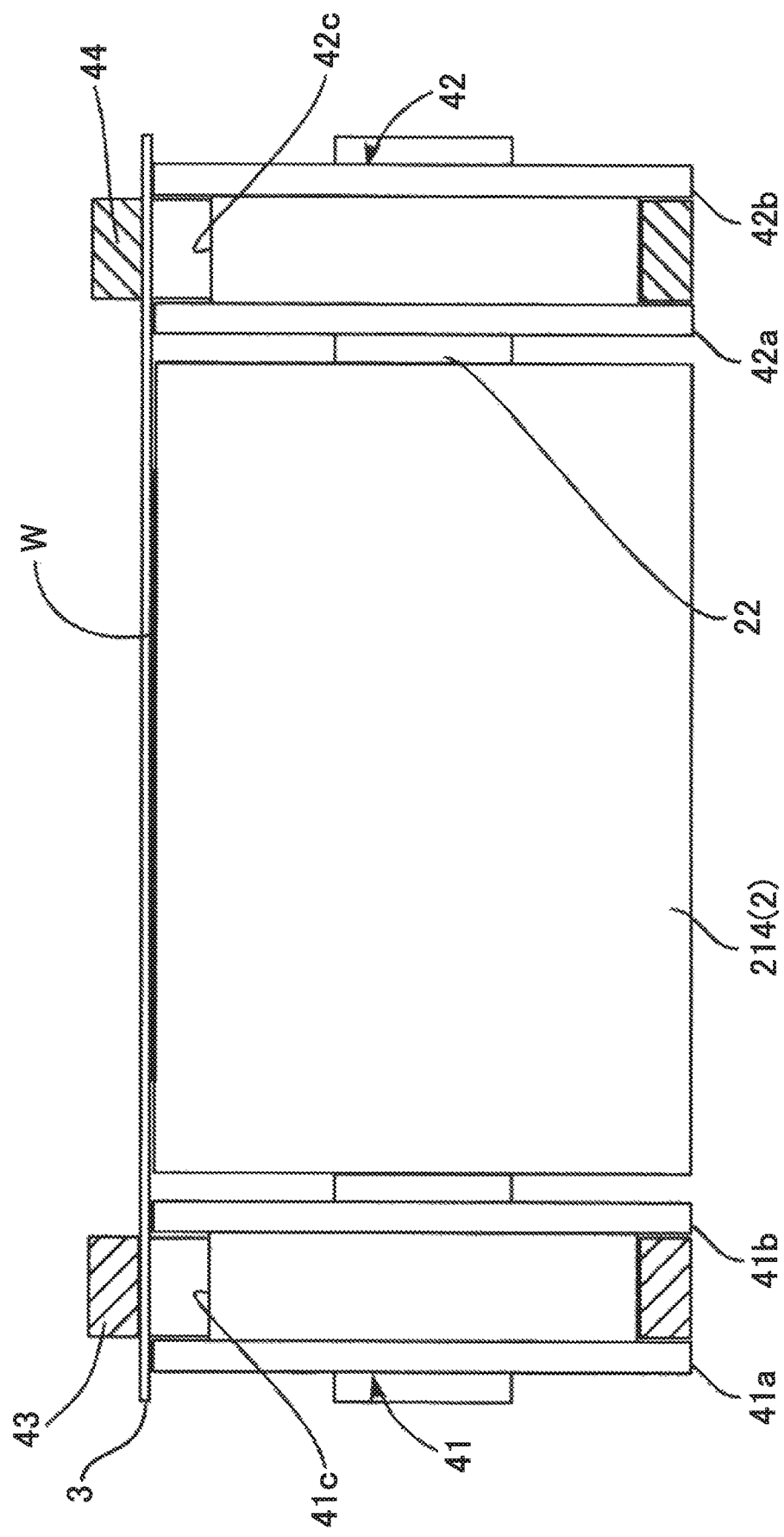
FIG. 7 is a partial sectional view of the web drying device when the web after reversal passes along the pulleys during the conveyance by the foil extending member, when viewed in a direction perpendicular to a rotational axis of the pulleys.
Figure 8:
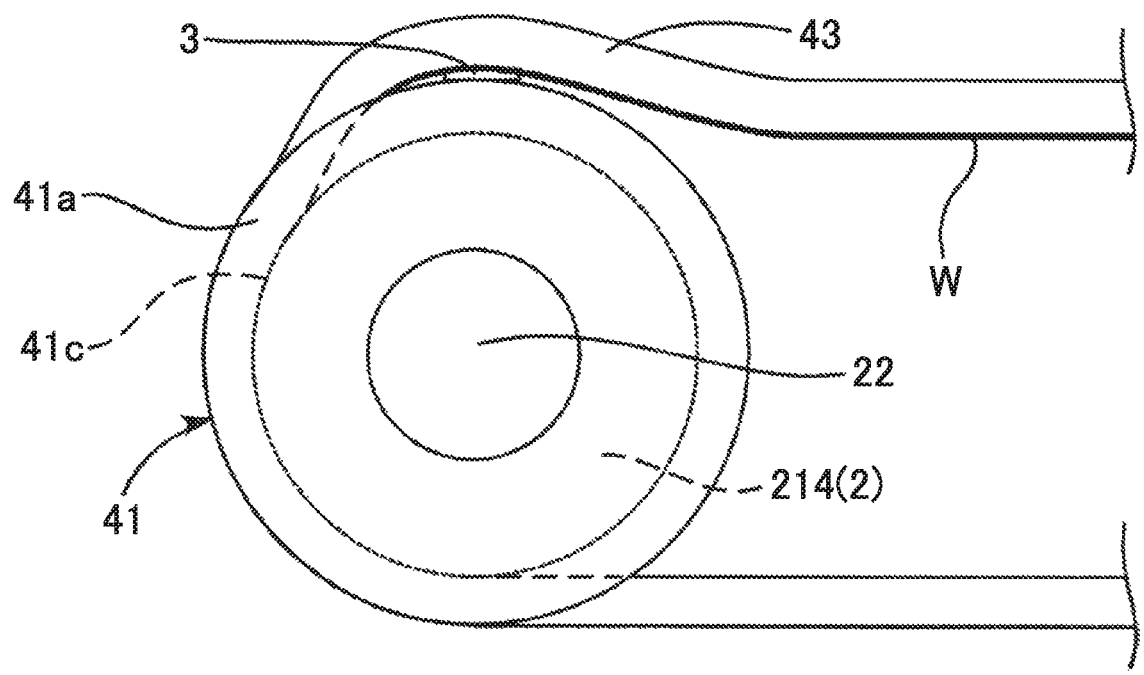
FIG. 8 is a view of the web drying device in FIG. 7 when viewed in a direction of the rotational axis of the pulley.

As shown in FIGS. 7 and 8, when the foil extending member 3 passes along the outer peripheral surfaces of the first and second foil extending pulleys 41, 42 of the fourth roller 214, the positions of the foil extending member 3 and the first and second foil extending belts 43, 44 are reversed and the first and second foil extending belts 43, 44 come off the grooves 41c, 42c of the first and second foil extending pulleys 41, 42.

However, as shown in FIG. 7, both ends of the foil extending member 3 are supported by the flanges 41a, 41b, 42a, 42b of the first and second foil extending pulleys 41, 42.

Therefore, deflection of the ends of the foil extending member 3 is small compared to the foil extending member 3A described above, even when tensile force in the rotational direction is applied to the first and second foil extending belts 43, 44.

Additionally, as shown in FIG. 8, portions of the first and second foil extending belts 43, 44 that are offset from portions to which the foil extending member 3 is fixed are fitted in the grooves 41c, 42c of the first and second foil extending pulleys 41, 42. Thus, even if the forces applied to the ends of the foil extending member 3 are unbalanced, there is no risk of the first and second foil extending belts 43, 44 falling off the first and second foil extending pulleys 41, 42. Thus, the foil extending member 3 moves smoothly along the outer periphery of the first and second foil extending pulleys 41, 42.

The foil extending member 3 needs to be formed so that the ends of the foil extending member 3 do not fall into the grooves 41c, 42c of the first and second foil extending pulleys 41, 42 when the ends of the foil extending member 3 are deflected due to the forces applied thereto. Thus, the foil extending member 3 is formed of a resin material having a rigidity that can suppress the deflection to such a degree that the fall-in described above does not occur. If the rigidity of the foil extending member 3 cannot be sufficiently ensured, the foil extending member 3 is formed to have the length L1 that is sufficiently longer than the length L2 between the outer edges of the outer flanges 41a, 42b, in view of the deflection described above.

Figure 12:
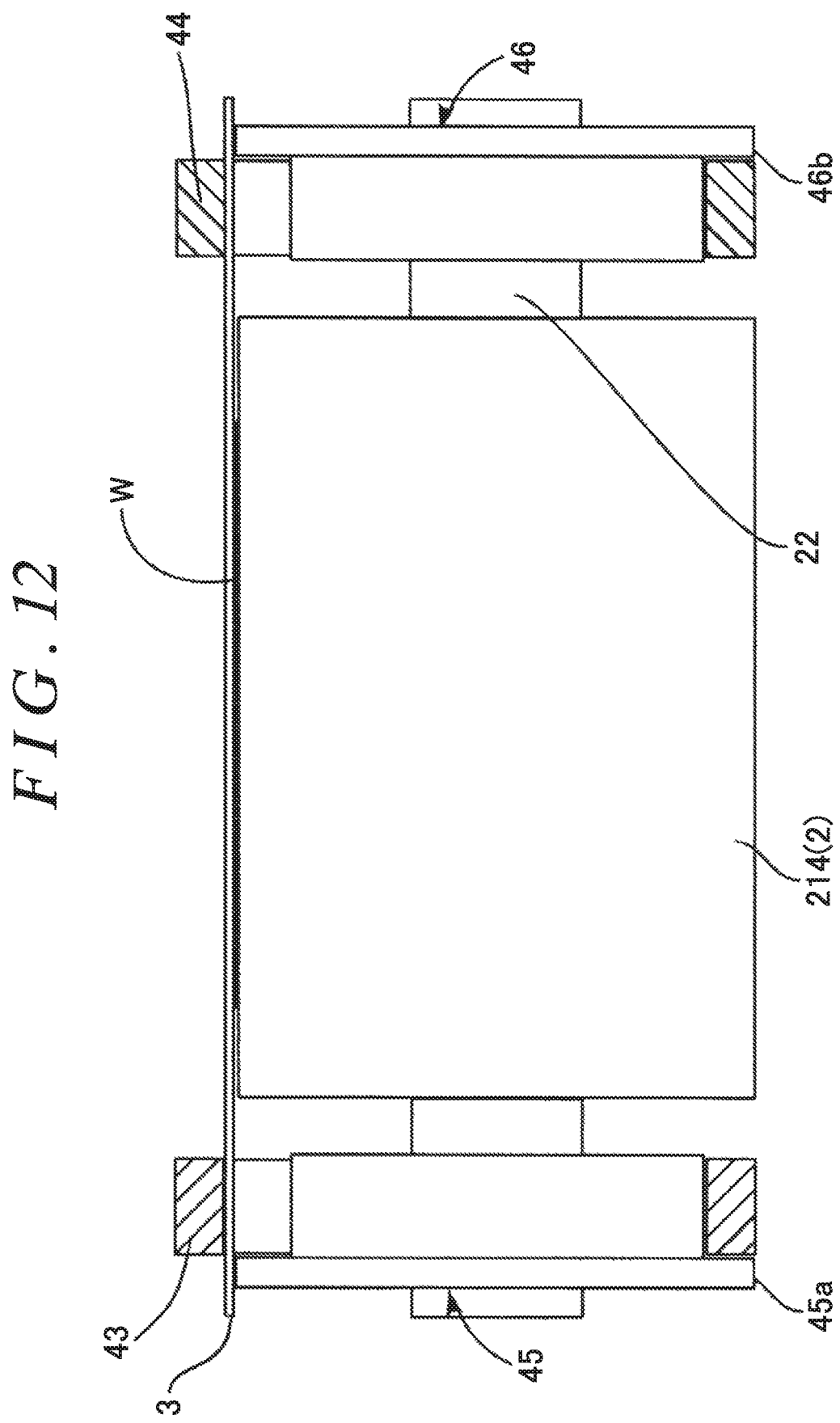
FIG. 12 is sectional view of another embodiment of the web conveying device with reference to FIG. 3.

The first and second foil extending pulleys 41, 42 described above are configured to have the flanges 41a, 41b, 42a, 42b on the peripheral edges of their end faces. However, first and second foil extending pulleys 45, 46 that have flanges 45a, 46b, respectively, on the peripheral edge of only one end face may be provided, as shown in FIG. 12. In this case, the first and second foil extending pulleys 45, 46 are disposed so that the flanges 45a, 46b face outwards and are supported by the roller shaft 22, since the foil extending member 3 prevents the first and second foil extending belts 43, 44 from falling out of the first and second foil extending pulleys 45, 46.

Drying of the web W is performed by the web drying device 1 after the operator performs conveying preparatory operation of the web W. First, the conveying preparatory operation of the web W by the operator will be described referring to a flowchart in FIG. 4. Next, the drying operation of the web drying device 1 will be described referring to a flowchart in FIG. 5.

In the web drying device 1, the fan and the heater of the hot air generator 5 are turned on to blow hot air, and the temperature inside the drying chamber 6 is maintained at a prescribed temperature. Additionally, coating material is applied to the surface Wa of the web W with a coating device not shown.

Figure 4:
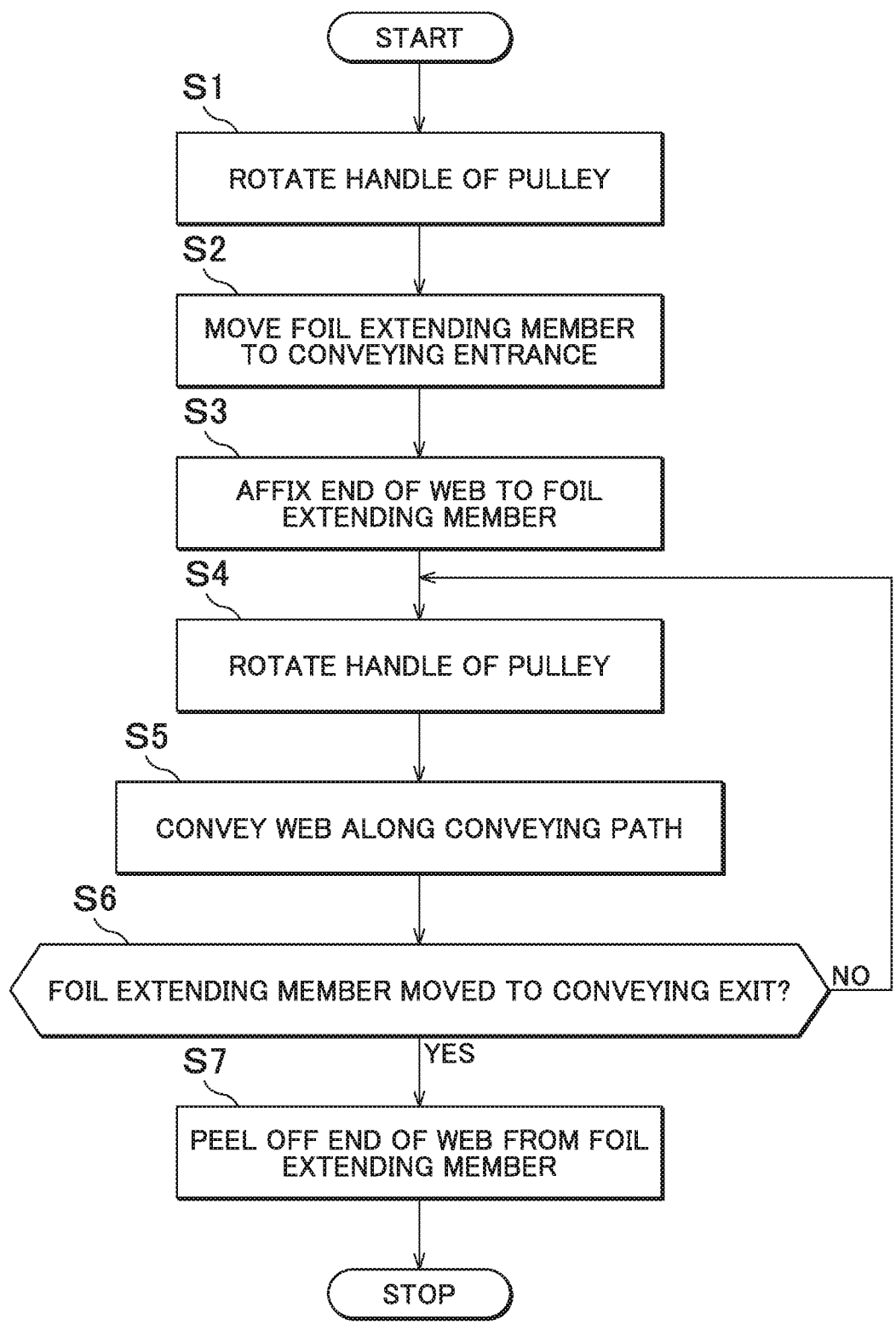
FIG. 4 is a flowchart for describing the conveying preparatory operation of the web by the web conveying device.

The operator rotates the handle provided on the first foil extending pulley 41 of the first roller 211 (step S1 in FIG. 4), moves the foil extending member 3 to a position on an upper outer peripheral surface of the first roller 211 at the conveying entrance 61 (step S2 in FIG. 4), and affixes the end of the web W to the foil extending member 3 (step S3 in FIG. 4).

The operator then rotates the handle to rotate the first and second foil extending belts 43, 44 (step S4 in FIG. 4) and conveys the web W from the second roller 212 to the sixth roller 216 at the conveying exit 62 via the third, fourth, and fifth rollers 213, 214, 215 (step S5 in FIG. 4).

In the fourth and fifth rollers 214, 215, the first and second foil extending belts 43, 44 can smoothly convey the web W without coming off the first and second foil extending pulleys 41, 42. The operator then determines whether the foil extending member 3 has moved to the position at the upper outer peripheral surface of the sixth roller 216 at the conveying exit 62 (step S6 in FIG. 4). If the foil extending member 3 has not moved to the position at the upper outer peripheral surface of the sixth roller 216, the operator returns to step S4 and repeats the operation described above. If the foil extending member 3 has moved to the position at the upper outer peripheral surface of the sixth roller 216, the operator peels off the end of the web W from the foil extending member 3 (step S7 in FIG. 4) and the conveying preparatory operation is completed.

Figure 5:
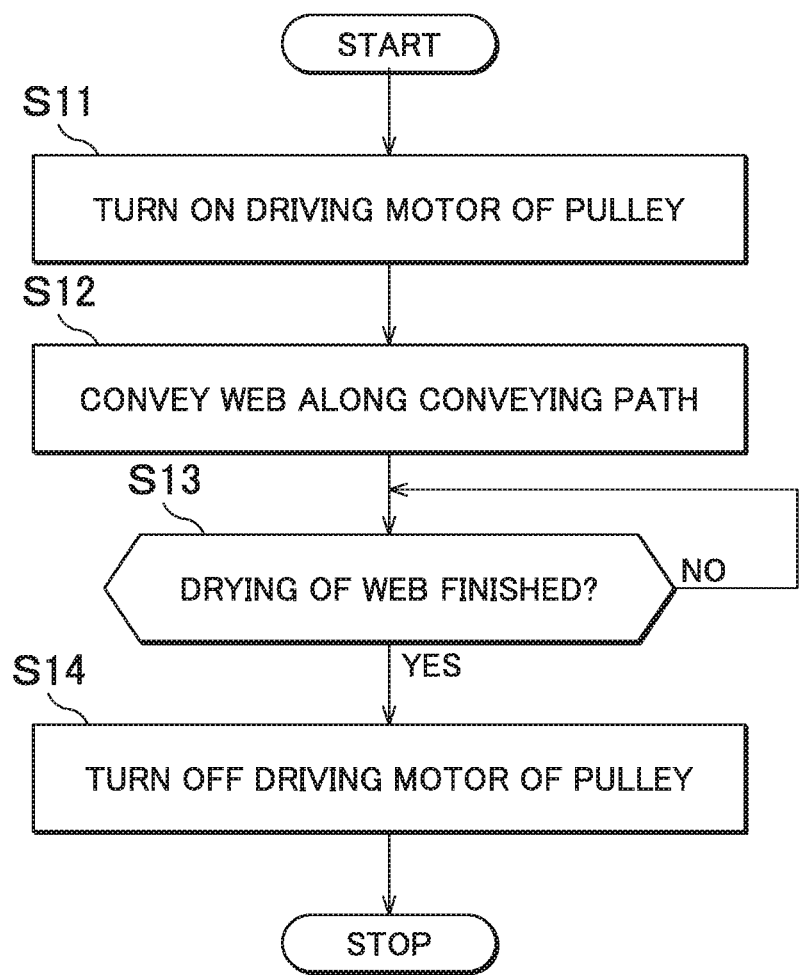
FIG. 5 is a flowchart for describing the operation of the web drying device.

In the web drying device 1, the driving motor 24 is turned on so that the first and second foil extending pulleys 41, 42 of the sixth roller 216 are rotated (step S11 in FIG. 5), and the first and second foil extending belts 43, 44 are rotated to convey the web W (step S12 in FIG. 5). The web drying device 1 then determines whether drying of the web W is completed (step S13 in FIG. 5). When drying of the web W is completed, the driving motor 24 is turned off to stop the rotation of the first and second foil extending pulleys 41, 42 of the sixth roller 216 (step S14 in FIG. 5) and all operations are completed.

A modification of the web conveying device will be described with reference to FIGS. 13 and 14 corresponding to FIGS. 2 and 3. The configuration of the web drying device 1 that has a web conveying device 7 of the modification, when viewed in a direction parallel to the surface of the web W and perpendicular to the conveying direction of the web W, is the same as the configuration in FIG. 1, and thus, the description thereof will be omitted. In FIGS. 13 and 14, the same constituent members as those in FIGS. 2 and 3 are denoted with the same reference characters, and detailed description thereof will be omitted.

As shown in FIG. 13, the web conveying device 7 of the modification has the foil extending member 3 and a moving mechanism 8 etc. That is, the web conveying device 7 of the modification does not have the foil supporting member 2 that has the first to eighth rollers 211 to 218 shown in FIG. 2. The moving mechanism 8 has a plurality (eight, in the example) of first foil supporting pulleys 81, a plurality (eight, in the example) of second foil supporting pulleys 82, an endless track first foil supporting belt 83, and an endless track second foil supporting belt 84.

The first and second foil supporting pulleys 81, 82 are disposed in the same positions as the first and second foil extending pulleys 41, 42 shown in FIG. 2. That is, the first foil supporting pulleys 81 and the second foil supporting pulleys 82 are disposed on the same axis, and one ends of pulley shafts 85 that are fitted in the first and second foil supporting pulleys 81, 82 are each rotatably supported by the bracket 23 via a bearing not shown.

As shown in FIG. 14, flanges 81a, 81b are provided at peripheral edges of both end faces of the first foil supporting pulley 81. Flanges 82a, 82b are provided at peripheral edges of both end faces of the second foil supporting pulley 82.

As shown in FIGS. 13 and 14, the first foil supporting belt 83 is stretched between the first foil supporting pulleys 81 and is fitted in each groove 81c between the flanges 81a, 81b formed at the peripheral edges of both end faces of the first foil supporting pulley 81. The second foil supporting belt 84 is stretched between the second foil supporting pulleys 82 and is fitted in each groove 82c between the flanges 82a, 82b formed at the peripheral edges of both end faces of the second foil supporting pulley 81.

The first foil supporting belt 83 and the second foil supporting belt 84 have a function of supporting the surface of the web W with belt surfaces, that is, the first foil supporting belt 83 and the second foil supporting belt 84 function as the foil supporting member 2 that has the first to eighth rollers 211 to 218 shown in FIG. 2. The first foil supporting belt 83 and the second foil supporting belt 84 are formed so that metal foreign substances that adversely affect the electrodes are not generated, and are formed by resin that can withstand drying heat.

As shown in FIG. 14, in the web conveying device 7, if a width B of the web W (a length in the direction perpendicular to the conveying direction) is shorter than an interval L3 between the peripheral edges of the facing flanges 81b, 82a of the first and second foil supporting pulleys 81, 82, there is a risk of the web W falling off when the web W is reversed during conveyance.

However, if the width B of the web W (the length in the direction perpendicular to the conveying direction) is longer than the interval L3 between the peripheral edges of the facing flanges 81b, 81a of the first and second foil supporting pulleys 81, 82, the surface of the web W is supported by the flanges 81b, 82a of the first and second foil supporting pulleys 81, 82 and therefore the web W can be smoothly conveyed even if there are no first to eighth rollers 211 to 218. Thus, the cost of the rollers 211 to 218 can be reduced.

The first and second foil supporting pulleys 81, 82 are configured to have the flanges 81a, 81b, 82a, 82b at the peripheral edges of the end faces. However, first and second foil supporting pulleys 86, 87 that have flanges 86a, 87b, respectively, only at a peripheral edge on one end face may be provided, as shown in FIG. 15.

In this case, the first and second foil supporting pulleys 86, 87 are disposed so that the flanges 86a, 87b face outwards and are supported by the pulley shafts 85 in order to prevent the first and second foil supporting belts 83, 84 from falling off the first and second foil supporting pulleys 86, 87. The width B (the length in the direction perpendicular to the conveying direction) of the web W that can be conveyed in this configuration needs to be longer than an interval L4 between the peripheral edges of the flanges 86a, 87b of the first and second foil supporting pulleys 86, 87.

The first foil supporting belt 83 is stretched across the first foil supporting pulley 81 and the second foil supporting belt 84 is stretched across the second foil supporting pulley 82. However, one foil supporting belt may be provided, so as to extend between inner surfaces of the flanges 86a, 87b of the first and second foil supporting pulleys 86, 87, instead of the first and second foil supporting belts 83, 84. Since a surface of the foil supporting belt supports the surface of the web W, the web W can be smoothly conveyed regardless of the width (the length in the direction perpendicular to the conveying direction) of the web W.

In the embodiment described above, in the web conveying devices 10, 7, the web W is reversed twice by the third, fourth, and fifth rollers 213, 214, 215. However, the web conveying devices 10, 7 may be configured so that the web W is reversed one or more times. If the web W is reversed many times, the web conveying path becomes complex. However, the web W can be smoothly conveyed by the foil extending member 3 and the moving mechanisms 4, 8. Even if the reversal intervals (intervals in the up-down direction in FIG. 1) are narrow, the web W can be smoothly conveyed by the foil extending member 3 and the moving mechanisms 4, 8. By increasing the number of times the web W is reversed and by narrowing the reversal intervals, more hot air generators 5 can be disposed and a smaller web conveying device can be configured. Since the web W can be dried efficiently while continuous coating and intermittent coating is performed on the web W, production capacity can be improved.

In the embodiment described above, the web conveying devices 10, 7 are installed in the web drying device 1. However, the web conveying devices 10, 7 may be installed in other devices such as a web coating device. The web conveying devices 10, 7 are installed in a system for manufacturing electrodes of a lithium ion capacitor. However, the web conveying devices 10, 7 may be devices installed in a system for manufacturing electrodes of lithium ion rechargeable batteries.

What is claimed is:

1. A web conveying device, which includes a web conveying path that bends and conveys a web, comprising:
   a plurality of foil supporting members that are disposed at intervals in a conveying direction of the web and that support a surface of the web that is being conveyed;
   a foil extending member that extends the web from a starting point to an end point of the web conveying path formed by the foil supporting members, by conveying the web downstream in the conveying direction of the web; and
   a moving mechanism that moves the foil extending member from the starting point to the end point of the web conveying path, wherein
   the moving mechanism has a plurality of rotatable first foil extending pulleys which rotate about respective rotation axes, and a plurality of rotatable second foil extending pulleys that are that are separated from respective first foil extending pulleys in a transverse direction which is transverse to the conveying direction of the web and which rotate about respective rotation axes, the first and second foil extending pulleys each having opposing inner and outer peripheral edges in the transverse direction, the outer peripheral edge of each of the respective first and second foil extending pulleys being farther from an other respective one of the first and second foil extending pulleys in the transverse direction than is the inner peripheral edge of the respective first and second foil extending pulleys,
   an endless track first foil extending belt stretched between the respective first foil extending pulleys, and an endless track second foil extending belt stretched between the respective second foil extending pulleys,
   the foil extending member is stretched between the first foil extending belt and the second foil extending belt and fixed to the first foil extending belt and the second foil extending belt, and is moved from the starting point to the end point of the web conveying path by rotation of the first foil extending belt and the second foil extending belt in conjunction with rotation of the first foil extending pulleys and the second foil extending pulleys,
   a flange is provided at the outer peripheral edge of each of the first and second foil extending pulleys, and the flanges of the first foil extending pulleys and the flanges of the second foil extending pulleys face outward in a radial direction which is radial with respect to the respective rotation axes,
   the foil extending member is fixed to the first foil extending belt and the second foil extending belt so as to face an outer peripheral surface of the flange of each of the first foil extending pulleys and an outer peripheral surface of the flange of each of the second foil extending pulleys, and the foil extending member is longer in the transverse direction than a length between the flange at the outer peripheral edge of each of the respective first foil extending pulleys and the flange at the outer peripheral edge of each of the respective second foil extending pulleys, wherein the foil extending member extends outward of the outer peripheral edges of both of the respective first and second foil extending pulleys in the transverse direction.

2. The web conveying device according to claim 1, wherein
the web conveying device is provided in a web drying device that dries a coating material applied to the web.

3. The web conveying device according to claim 1, further comprising a plurality of rotatable rollers rotating about the respective rotation axes and each extending between respective ones of the first and second foil extending pulleys, wherein the plurality of rotatable rollers support the surface of the web with respective outer peripheral surfaces of the plurality of rotatable rollers.

4. The web conveying device according to claim 3, further comprising a flange provided at the inner peripheral edge of each of the first and second foil extending pulleys.

5. The web conveying device according to claim 1, further comprising a flange provided at the inner peripheral edge of each of the first and second foil extending pulleys.

* * * * *